United States Patent [19]

Bacevius

[11] 4,376,965

[45] Mar. 15, 1983

[54] CLAMPING LIGHT CONSTRUCTION AND CLAMPING MEANS THEREFOR

[76] Inventor: Joseph G. Bacevius, 780 Bridgeport Ave., Shelton, Conn. 06484

[21] Appl. No.: 107,373

[22] Filed: Dec. 26, 1979

[51] Int. Cl.³ .............................................. H04M 1/22

[52] U.S. Cl. .................................... 362/191; 362/103; 362/190; 362/202; 362/396

[58] Field of Search ............... 362/190, 191, 396, 103, 362/202

[56] References Cited

U.S. PATENT DOCUMENTS 3,918,191 11/1975 Williamson ..................... 362/191 X

*Primary Examiner*—Stephen J. Lechert, Jr.

*Attorney, Agent, or Firm*—Arthur T. Fattibene

[57] ABSTRACT

A clamp light construction which includes a clamp construction having connected thereto a portable light whereby the light can be readily used independently of the clamp construction and/or in conjunction therewith; and whereby the light beam when utilized in conjunction with the associated clamp construction can be securely maintained on a support thereby permitting both hands of an operator to be free to perform a work function other than holding the light during a work performing operation; and whereby the light so supported can be adjusted to direct its light beam on the work area. The clamp construction is also readily adapted to support other devices other than a light.

22 Claims, 17 Drawing Figures

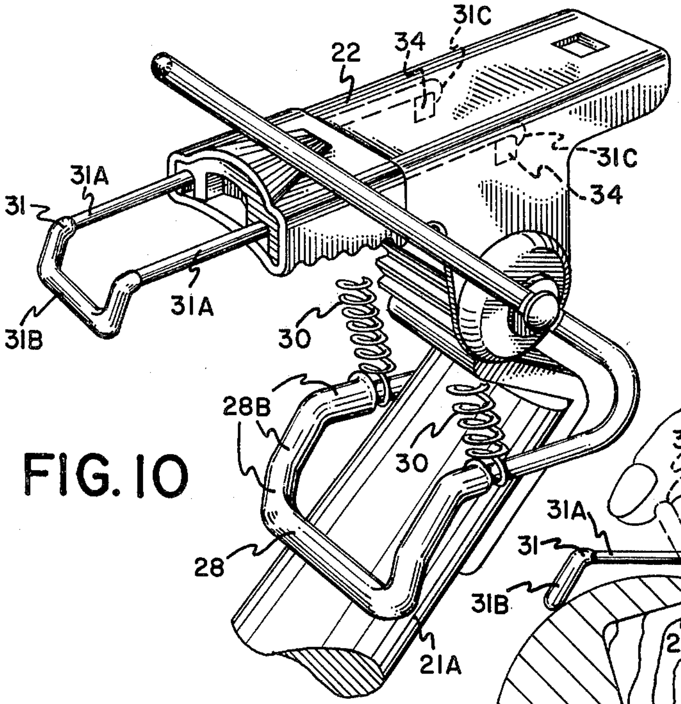
FIG. 10
FIG. 12
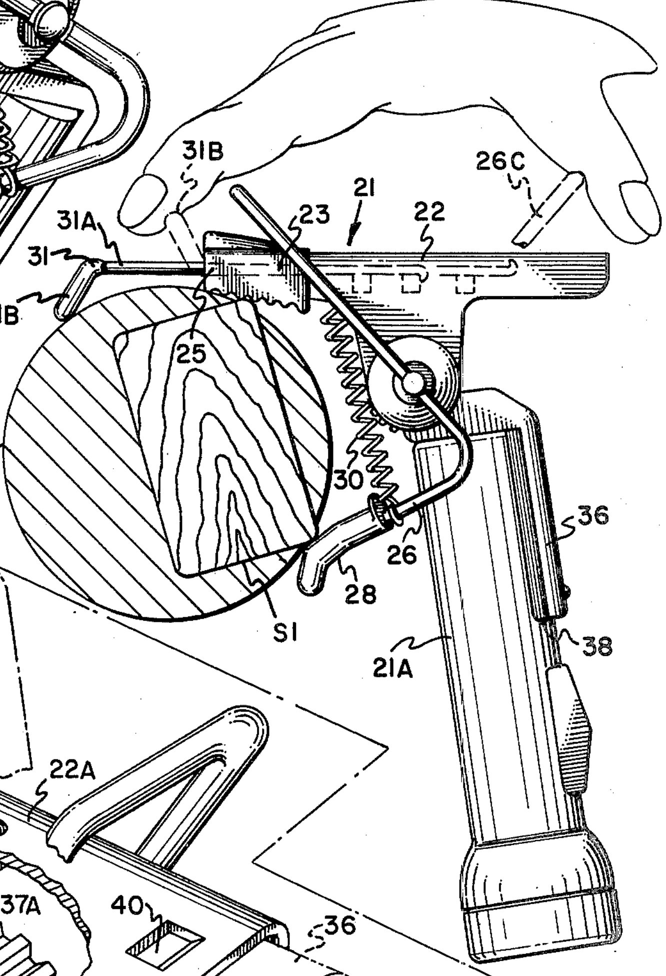
FIG. 11
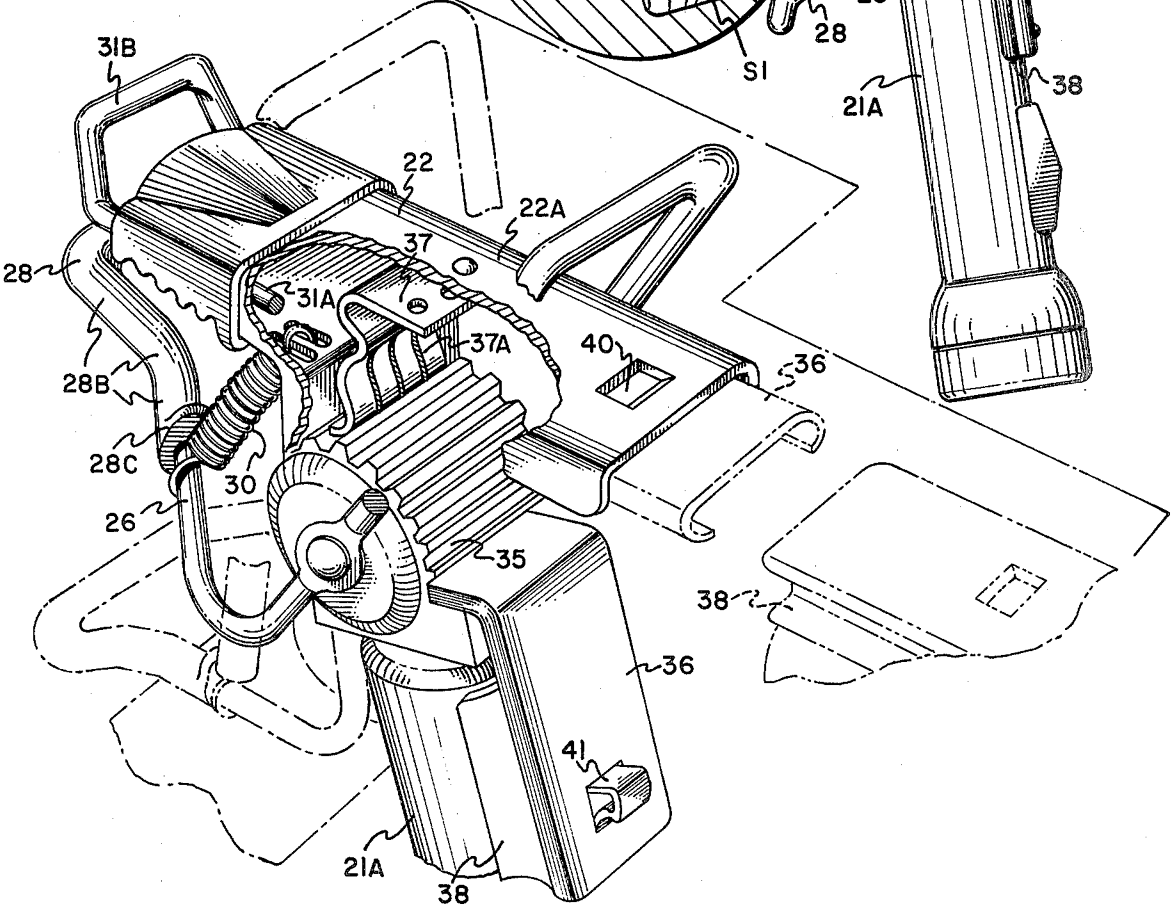

CLAMPING LIGHT CONSTRUCTION AND CLAMPING MEANS THEREFOR

PROBLEMS AND PRIOR ART

Heretofore, portable lighting, such as flashlights, lanterns and the like, which are in wide use today are required to be hand held, thereby depriving the use of one hand which could otherwise be used to do work other than holding the light. As many work functions require the use of two hands, it is generally impossible for an individual to perform a two hand task and direct a hand held light beam on the task area at the same time, unless another person is available to hold the light. In an effort to free both hands, particularly when the operator is alone, a makeshift support or holding arrangement for the light would be attempted by the operator. However, such efforts would generally not result in directing the maximum light beam onto the work area; nor are such makeshift efforts positive or reliable. While efforts have been made to provide various light arrangements with clamp means to secure the light beam so as to direct the light beam in a given direction, such clamping arrangements have not been satisfactorily adapted to the area of hand held lights such as flashlights, lanterns, and the like. The following U.S. Pat. Nos. 1,303,555; 1,684,347; 1,777,003; 3,393,311; 3,393,312; 3,418,461; 1,573,218; and 1,483,588 will evidence some of the known prior clamping light construction. Some known clamp constructions are evidenced by U.S. Pat. Nos. 473,919; 629,997; 1,546,739; 1,645,023; 2,331,831; 2,908,205; 3,112,104; 3,330,552; 3,499,626; and British Pat. No. 787,117.

OBJECTS

An object of this invention is to provide a novel clamp construction to which there is attached a portable light whereby the light can be positively clamped to a suitable support, thus freeing the operator to use both hands to perform a given work function.

Another object of this invention is to provide a clamping construction which can be readily adapted to any of the known standard flashlight or lantern types, battery operated portable lighting devices.

Another object of this invention is to provide a clamping construction and associated light construction which is compact and sufficiently small so as to be readily stored, as for example, in a glove compartment of a car or a coat pocket.

Another object of this invention is to provide a clamping construction and associated lighting device which is rendered simple and easy to operate, and which can be operated without the application of any excessive force.

Another object of this invention is to provide a clamping construction capable of positively clamping onto surfaces having variable cross sectional shapes.

Another object of this invention is to provide a clamping construction wherein the span or opening of the clamping jaws can be adjusted over a relatively wide range without effecting any shifting of the pivotal connection between the clamping jaws.

Another object of this invention is to provide a clamping light construction which will positively grip and securely hold a light onto a suitable supporting surface in a manner so as not to damage or mar the supporting surface.

Another object is to provide a clamping light construction whereby the light can swivel in either a vertical and/or horizontal plane to facilitate directing a light beam onto the work area which requires illumination.

Another object of this invention is to provide an improved clamping construction to which an article can be secured and maintained in a desired position on a suitable support.

Another object of this invention is to provide an improved clamping means which is relatively simple in construction, positive in operation, and relatively inexpensive to manufacture.

Another object of this invention is to provide a clamping light construction whereby the associated light can be adjusted relative to the clamping means so as to direct the light beam in any given desired direction.

Another object of this invention is to provide for a clamping light construction whereby the lighting device associated with the clamping means can be readily pivoted or adjusted relative to the clamp means and whereby the holding force of the clamping construction is increased as the lighting device is pivoted below or past the pivot point toward the clamping jaws.

Another object is to provide a clamping and swivel light beam system arranged to provide for a "handle free" operation of the light during the use thereof when both illumination and a two hand work operation is required.

Another object is to provide a clamping and swivel light beam system to which the present day or traditional type flashlight or lanterns can be used with little or no constructional change to the flashlight or lantern.

SUMMARY OF THE INVENTION

The foregoing objects and other features and advantages of this invention are attained by a clamping light construction which comprises a clamping assembly that includes a clamp housing, one end of which defines a clamping jaw and the other end of which being adapted to receive and/or support an article such as a portable flashlight or lantern. Pivotally connected to an intermediate portion of the clamp housing is a second jaw member which is formed as bail loop having opposed end portions. The bail loop is bent intermediate to the ends thereof so that one end of the bail loop defines a movable jaw complementary to the clamping jaw of the clamp housing, and the other end extending beyond the clamp housing to define a handle for actuating the jaws and/or for carrying the clamping light construction. A spring means is operatively connected between the complementary jaws for normally maintaining the jaws biased toward the closed position.

Associated with the jaw end of the clamp housing is a jaw extension which is arranged to retract and protract relative to the clamp housing whereby the span opening or distance between the gripping jaws can be adjusted over a relatively wider range of jaw openings.

In one form of the invention the clamp housing is integrally formed as a part of the lighting device.

In another form of the invention the clamp housing has connected thereto a suitable bracket to which a conventional known flashlight or lighting device can be detachably secured.

In still another form of the invention the clamp housing has pivotally connected thereto an indexing wheel which has connected thereto a laterally extending arm or holder which may comprise a rail or keyway for receiving a complementary slide secured to the casing of a flashlight. The arrangement is such that the slide associated with a flashlight casing can be readily detachably connected to the keyway or rail. With the light detachably connected to the indexing wheel the light can be swiveled or indexed angularly about the rotational axis of the indexing wheel so that the light beam projected by the light can be directed in any desired direction. A spring detent is operatively associated with the indexing wheel to maintain the indexing wheel in its adjusted position.

In still another form of the invention, the clamp housing is connected to a casing for supporting a battery pack; and connected to the end of the housing opposite to the jaw portion is a bulb and reflector assembly in a light housing which is wired in circuit to the battery pack supported in the battery casing. In this form of the invention the clamp assembly is capable of supporting substantial weight as the battery casing facilitates and enhances the gripping force exerted by respective jaws.

FEATURES

A feature of this invention resides in the provision of a novel clamping assembly which is readily adapted for use with a flashlight or lantern type lighting device to provide for "hands free" illumination of a work area.

Another feature resides in the provision of an improved clamping light assembly whereby the light can be either integrally formed or detachably connected to a clamping assembly.

Another feature resides in the provision of a clamping light assembly which can be readily detachably connected to and supported on variable types of suitable supports.

Another feature resides in the provision of a clamping light assembly to which a light can be detachably connected to a clamping assembly and when connected thereto can be swiveled to direct the light beam in a desired direction.

Other features and advantages will become readily apparent when considered in view of the drawings and specification in which:

FIG. 10 is a perspective view of the clamping assembly embodying the present invention, illustrating the jaw extension shown in an extended position.

FIG. 11 is another perspective view of the clamping assembly having portions broken away; and showing the jaw extension in the retracted inoperative position.

FIG. 12 is a side view illustrating the manner in which the clamping assembly of the instant invention can be applied to varying types of supporting members.

DETAILED DESCRIPTION

Figures 1, 2, 3, 4, 5:
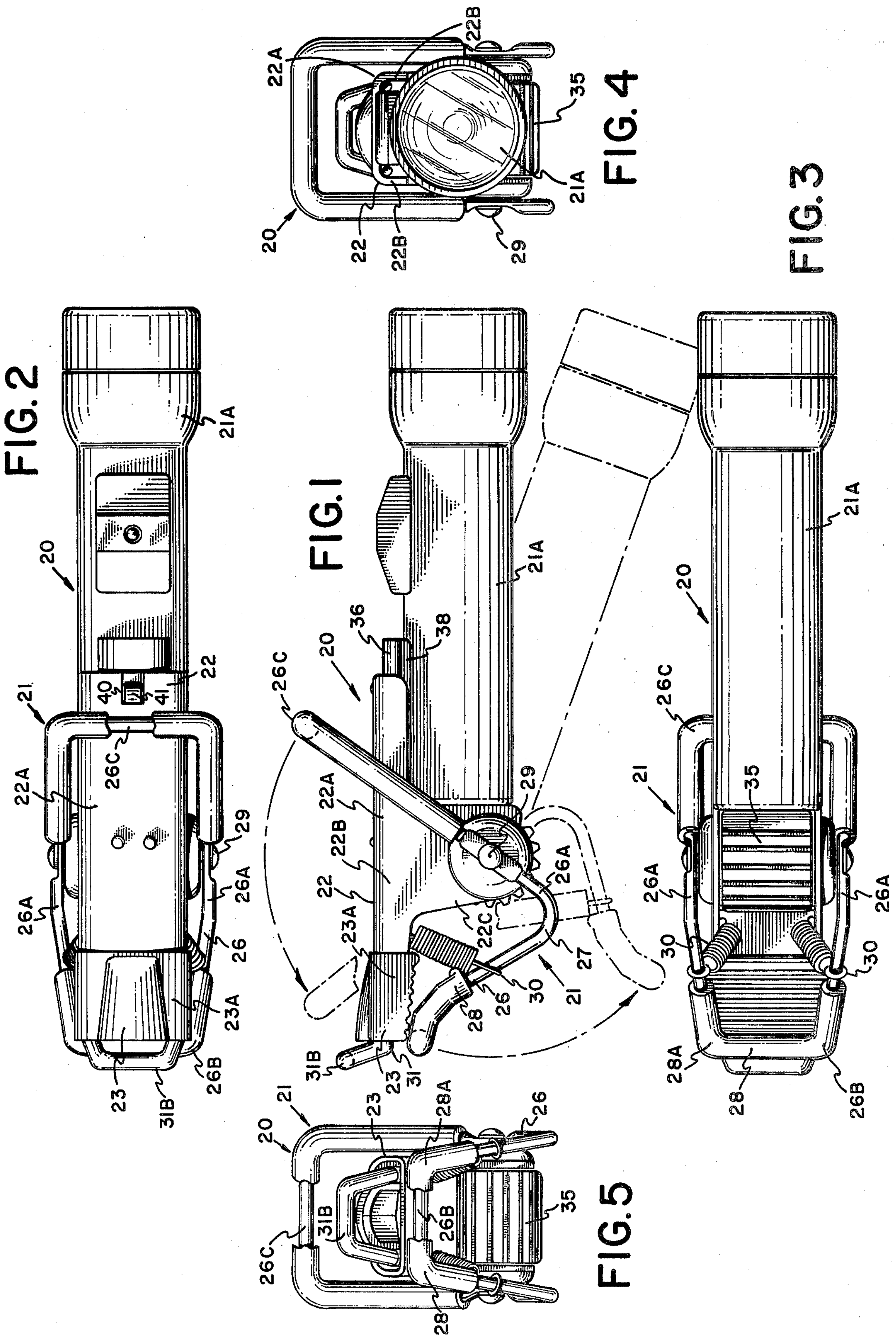
FIG. 1 is a side elevation view of a clamping light construction embodying the present invention.
FIG. 2 is a top plan of the clamping light construction of FIG. 1.
FIG. 3 is a bottom plan view of the clamping light construction of FIG. 1.
FIG. 4 is a right end view of FIG. 1.
FIG. 5 is a left end view of FIG. 1.

Referring to the drawings, there is shown in FIGS. 1 through 10 a clamping light construction 20 embodying the present invention. As shown, the clamping light construction 20 comprises a clamping assembly 21 and an associated light device 21A, as for example, a portable flashlight or lantern. The clamping assembly is defined by main clamp housing 22 which has a flat top 22A having connected along the longitudinal edges thereof a depending side wall portion 22B. Intermediate to the ends of the side wall portions 22B there is formed a depending yoke 22C. The main clamp housing 22 thus defines a fixed clamping jaw 23 at one end thereof. The other end of the clamp housing 22 is arranged to receive and/or support an article, such as for example, a portable flashlight or lantern 21A as will hereinafter be described.

Figures 6, 7, 7A, 8, 9:
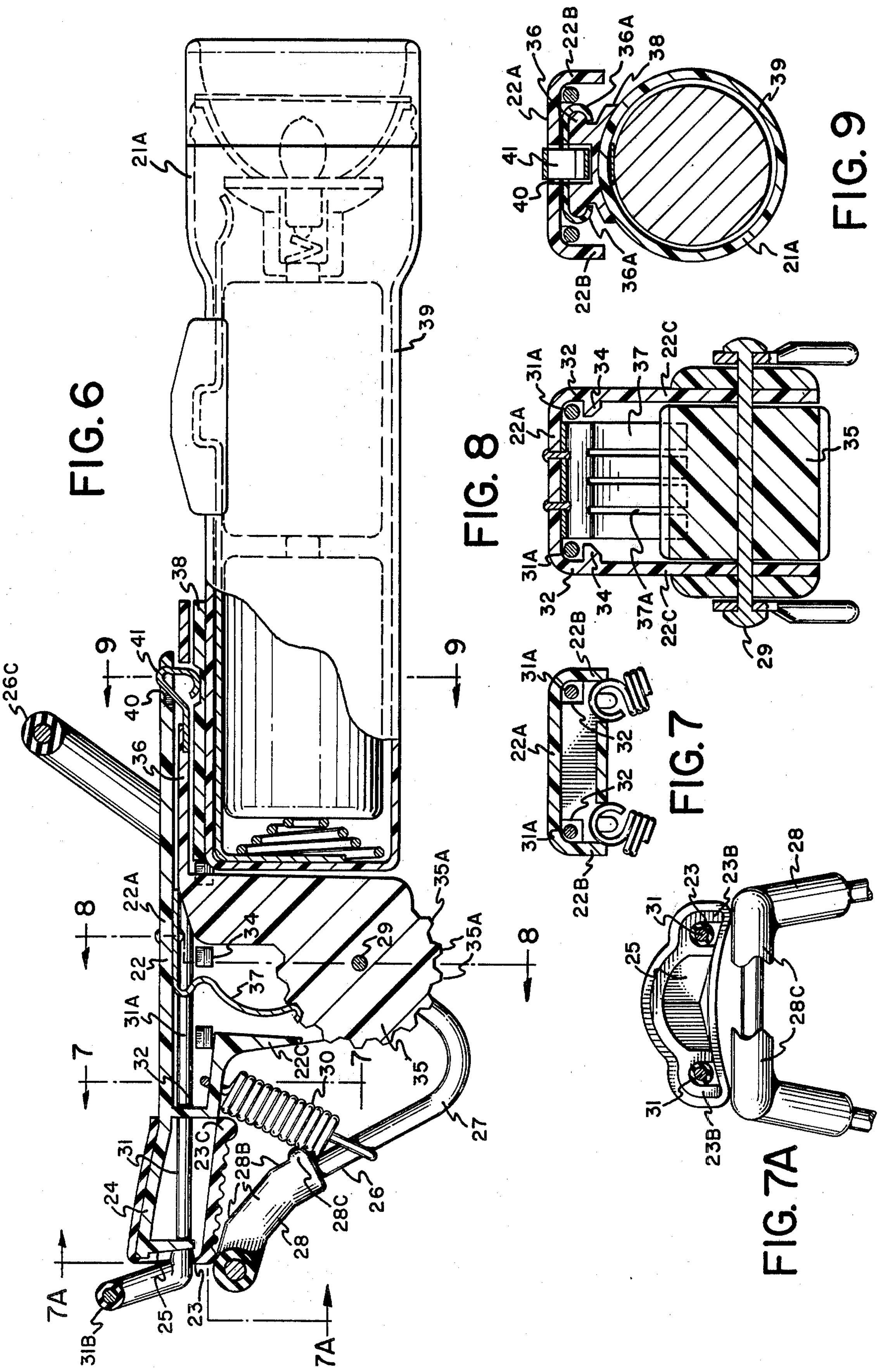
FIG. 6 is an enlarged sectional side view of the clamping light construction of FIG. 1.
FIG. 7A is a detail sectional view taken along line 7A—7A on FIG. 6, illustrating the grip biting pattern of the jaws together.
FIG. 7 is a detail sectional view taken along line 7—7 on FIG. 6.
FIG. 8 is a detail sectional view taken along line 8—8 on FIG. 6.
FIG. 9 is a detail sectional view taken along line 9—9 on FIG. 6.

Referring to FIG. 6, the front end portion of the top plate 22A of the main clamp housing is slightly upwardly inclined as shown at 24 and which end portion terminates in a depending front flange 25. As will be hereinafter described the depending flange 25 is arranged to function as a finger grip for effecting the actuation of the clamp toward the open position.

Pivotally connected to the opposed yoke portions 22C of the main clamp housing 22 is a second or movable jaw member, as best seen in FIGS. 1 through 5. Jaw member 26 comprises a bail loop having opposed side portions 26A which are interconnected at the ends thereof by a cross member 26B and 26C. As shown in FIG. 1, the side portions 26A of the bail loop are reversely bent intermediate to the ends thereof as at 27 so that one end of the bail loop defines a movable jaw 28 to complement the fixed clamping jaw 23 of the clamp housing 22. The other end of the bail loop member 26, which extends beyond the top plate of the clamp housing 22, defines a handle which functions to either actuate the jaws 23 and 28 as will be hereinafter described, and/or for carrying the clamping light construction.

The opposed side portions 26A, and particularly the distance between them is constructed to not only straddle the clamp housing 22, but also to straddle any standard light casings that will pivot in the movable jaw 28 area as shown in FIG. 10 and FIG. 11, and in this way permit vertical light beam adjustment of nearly 180°.

A pivot pin 29 journalled in the opposed yoke portions 22C pivotally connects the bail loop member to the main clamping member. As shown in FIGS. 1 through 5, a pair of coil springs are interconnected between the fixed jaw portion 23 of the main clamp housing 22 and the jaw portion 28 of the movable jaw member 26. The ends of the respective springs 30 are suitably anchored to the respective fixed and movable jaw portions 23 and 28. The arrangement of the springs 30 is such that the springs will normally maintain the jaws 23 and 28 biased toward their closed position, as indicated in FIG. 1.

In the illustrated embodiment FIGS. 1 through 5, both the fixed jaw portion 23 and the movable jaw portion 28 may be covered with a suitable protective sleeve or coating 23A and 28A, respectively, of rubber or suitable plastic so as to provide a non-slip, non-marring surface for the respective jaw portions.

Also illustrated in this embodiment, as shown in FIG. 6, the movable jaw portion 28 is formed in several angular planes 28B to achieve superior gripping power and more readily adapting to the wide range supporting possibilities of this particular jaw span. In co-operation with jaw 28, shown in FIG. 7A, is a front view of both jaws 23 and 28 in a bite pattern. The sections 23B of Jaw 23 are tapered and curved inwardly towards the center to create a hollow and wide mouth two prong linear biting pattern against the horizontal jaw section 28C. As the jaws are adjusted for larger supporting holding structures, the rubber or plastic coating compresses to some degree to co-operate with the particular lower jaw angular plane 28B being utilized, and achieving superior biting pattern in conjunction with the two prong linear design of the upper biting jaw 23. It must also be pointed out that the protruding lugs 28C and 23C shown in FIG. 6 may be utilized as supporting structure restraining lugs. Specifically to function as a stop for any delicate supporting structure that might possibly be scratched or marred by the springs 30.

In accordance with this invention, a jaw extension 31 is operatively associated with the fixed jaw portion 23 of the main clamp housing 22. Referring to FIGS. 1 and 6, the jaw extension 31 comprises a generally U shaped member having opposed leg portions 31A which are arranged in sliding relationship to the jaw portion 23 of the main clamp housing 22. The front end portion 31B of the jaw extension is upwardly bent, as indicated in FIG. 6, with the cross piece or bight portion thereof extending between the opposed leg portion 31A. This front end 31B is also covered with a sure grip, non marring material. As shown in FIG. 7, the main clamp housing 22 is provided with suitable guides 32 for slidably receiving the leg portions 31A of the jaw extension 31. Therefore, as best seen in FIGS. 10 and 12, the jaw extension 31 can be extended to a protracted position. It is also to be noted that the front or bent portion 31B of the jaw extension 31 can be disposed to extend either in an upwardly direction as seen in FIG. 6 wherein the bent front portion can function as a finger grip to facilitate the opening of the clamp, or reversely disposed in the extended position, as indicated in FIGS. 10 and 12, to function as a gripping and locking jaw. As disclosed in FIG. 12, with the jaw extension 31 in the retracted position, as shown in the dotted line showing thereof, it will be noted that the fixed jaw 23 of the main clamp housing 22 and the movable jaw 28 function to grip a supporting surface $S_1$ therebetween. The opening span of the clamp assembly 21 can be substantially increased by protracting the jaw extension 31, as indicated in the solid line showing of FIG. 12. Thus, the clamping assembly 21 can be secured to a much larger support $S_2$ by causing the support $S_2$ to be gripped between the extended jaw 31B and movable jaw 28. It should be noted also that the extended jaw 31B in the protracted position as shown in FIG. 12, not only acts as an extended gripping jaw for much larger supports, but also acts as a gripping lock to prevent slipping of the clamping action from the larger and irregularly shaped supports. From the foregoing description, the clamp assembly 21 can be adapted to have a relatively wide range of jaw openings so as to adapt the clamping assembly to varying sizes and shapes of supporting structures. As indicated in FIG. 10, the inner ends 31 C of the respective leg portions 31A of the jaw extension 32 are provided with a turned in portion which co-operates with a stop 34 integrally formed on the inside portion of the clamp housing so as to limit and lock the adjusted position of the clamp jaw extension during the extended gripping function.

In the form of the invention disclosed in FIGS. 1 through 9, an indexing wheel 35 is rotatably journalled about the pivot pin 29 between the yoke portions 22C of the clamp housing 22. As best seen in FIG. 6, the indexing wheel 35 is provided with a plurality of transversely extending teeth 35A circumferentially spaced over a major circumferential portion thereof. Integrally connected to the indexing wheel 35 is a laterally extending arm 36 which in the neutral position of the indexing wheel is adapted to abutt against the undersurface of the main clamp housing 22. A spring detent 37 connected to the under portion of the top plate 22A is arranged to engage the spaces between teeth 35A of the indexing wheel so as to maintain the indexing wheel in any given adjusted position. If desired, the spring detent 37 may be provided with a plurality of longitudinally extending slots 37A to define a plurality of spring fingers to give the spring detent added resiliency.

In the form of the invention shown in FIGS. 1 through 9, the arm 36, which extends laterally of the indexing wheel 35, is provided with opposed longitudinally depending sides 36A to define a keyway for slidably receiving an article such as a flashlight. As shown in FIGS. 6 to 9 the flashlight 21A is provided with a slide adapter 38 connected to the outer light casing 39 which is arranged to contain the batteries and the other components of the light assembly, for example the lens, bulb reflector sub-assembly, electrical contacts, switches, and alike all of which are of conventional construction. The slide adapter 38 connected to the light casing 39 is shaped to complement the keyway of the arm or holder 36 so that the light 21A is detachably connected to the clamping assembly by simply sliding the slide into the keyway of the arm or holder 36. With the construction described, it will be noted that the flashlight 21A can be readily indexed, swiveled or pivoted about the pivot pin 29 merely by rotating the index wheel to the desired angular position. The light 21A connected to the arm 36 is thus rotated as the indexing wheel 35 is rotated. With the construction described, an operator requiring the need of both hands to perform a work function as well as illumination, can readily clamp the light onto a suitable supporting surface adjacent to the work area, and rotate or adjust the light beam accordingly to the desired direction.

Shown in FIG. 12, it will be apparent that by spreading the thumb and forefinger of one hand to engage the handle portion 26C of the movable jaw member 26 and either the finger grip portion 25 of the clamp housing or the finger grip portion 31B of the jaw extension 31, the jaws 23, 28, can be readily opened to the desired extent with relative ease by squeezing whereby the clamping assembly 21 can be secured to a suitable supporting surface. It will be noted that the clamping construction is such that it can be clamped on to a supporting object either in the position shown in FIG. 12 or can be reversed 180 degrees as may be necessary. As the clamp assembly can be supported in a position as shown in FIG. 12 or reversed by 180 degrees, it will be noted that the adjustment of the light can be adjusted nearly over a full range of 360 degrees.

If desired, a latching means may be interposed between the holder or arm 36 and the top plate 22A of the main clamp housing 22. Such a latching arrangement can be utilized to secure the connected light device 21A in a lock neutral horizontal position. Such latching means comprises an opening formed in the top plate 22A of the clamp housing 22 and a complementary catch connected to the arm 36 as shown in FIG. 6. When the light 21A is disposed in a neutral position as shown in FIG. 6, the catch 41 is disposed to extend into opening 40 of the top plate 22A and positively lock the light as shown. To release the latch, the catch 41 is slightly manually displaced to effect the disengagement thereof.

Figure 13:
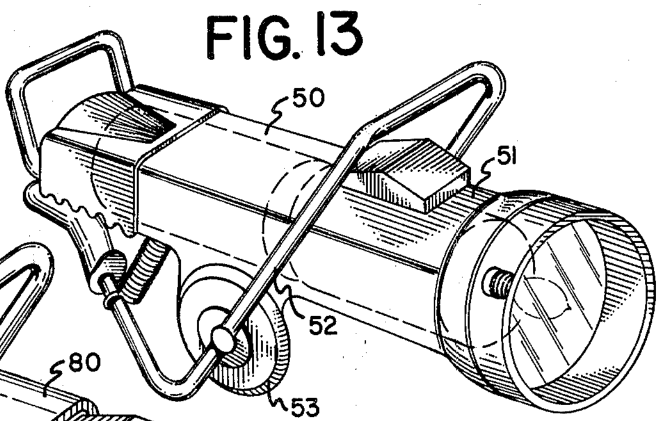
FIG. 13 is a perspective view of a modified embodiment of the invention wherein the light device is integrally formed to the clamp housing.

FIG. 13 illustrates a perspective view of a modified form of the invention. In this form of the invention the main clamp housing 50 has integrally formed therewith a tubular casing 51 which defines the body of the flashlight. In this form of the invention the clamping assembly which is integrally formed with the light casing 51 is similar to that described, except that in this form the indexing wheel, as described with respect to FIGS. 1 through 12, has been omitted. Therefore, the clamping assembly of this embodiment includes a main clamping housing portion 50 which defines a fixed jaw at the end and a flashlight casing construction at the other end thereof. The second jaw member 52, which comprises the endless bail loop, similar to that described with respect to FIGS. 1 and 10 is pivotally connected to the depending yoke portion 53 of the clamp housing 50. In all other respect, the construction and operation of the clamping assembly or clamping portion 50 and 52 of this modification is similar to that hereinbefore described, and need not be further described.

Figure 15:
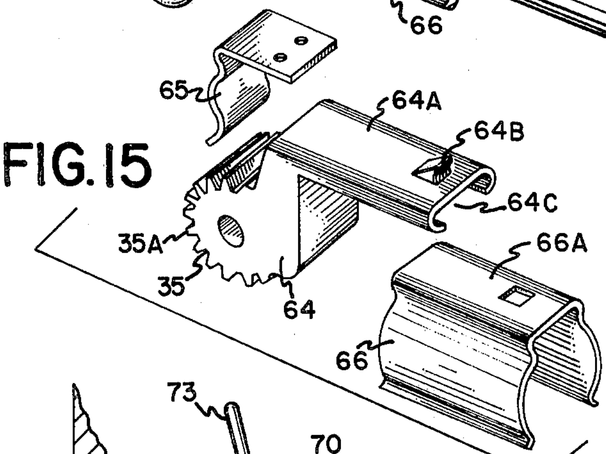
FIG. 15 is an exploded perspective view of the indexing means as utilized in the embodiment disclosed by FIG. 14.
Figure 14:
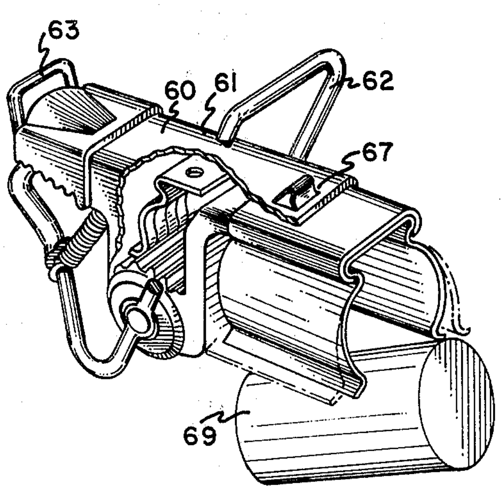
FIG. 14 is a perspective view of another modified form of the invention with indexing means.

FIGS. 14 and 15 illustrate another modified form of the invention. In this form of the invention, the clamping assembly 60 is similar in all respects to that described with respect to FIGS. 1 through 12. However in this form of the invention, a modified holder is provided so as to enable the clamping assembly 60 to be readily adapted for use with any standard type flashlight 69. The clamping assembly 60 as described comprises a main clamp housing 61, a movable jaw member 62, a jaw extension 63, and indexing wheel 64, and connected arm or holder 64A, and spring detent 65, all similar to that described with respect to FIGS. 1 to 12. However, in this form of the invention, a U-shaped spring bracket 66 is provided which is arranged to be connected to arm 64A. In the form shown in FIGS. 14 and 15 the U-shaped bracket 66 is provided with a slide 66A which is slidably received within the keyway 64C of arm 64A. With this construction, it will be apparent that the conventional round bodied light construction can be readily detachably received within the sides of bracket 66 to detachably hold a light 69 therebetween.

In operation, the clamp assembly 60 and associated light 69 can be utilized in the same manner as described with respect to FIGS. 1 to 10. If desired, the holder or arm 64A may be provided with a catch 64B which may be arranged to latch with a catch opening 67 formed in the top plate of the clamp housing 61. While the bracket 66 is illustrated as being slidably connected to arm 64A, it will be understood that the bracket 66 may be integrally formed as a unitary part of arm 64A.

In the embodiment as disclosed in FIGS. 14 and 15, it will be apparent that the light 69 secured to the bracket 66 can be swiveled about the pivot of the indexing wheel 64 in the same manner as that described with respect to FIGS. 1 through 12.

Figure 17:
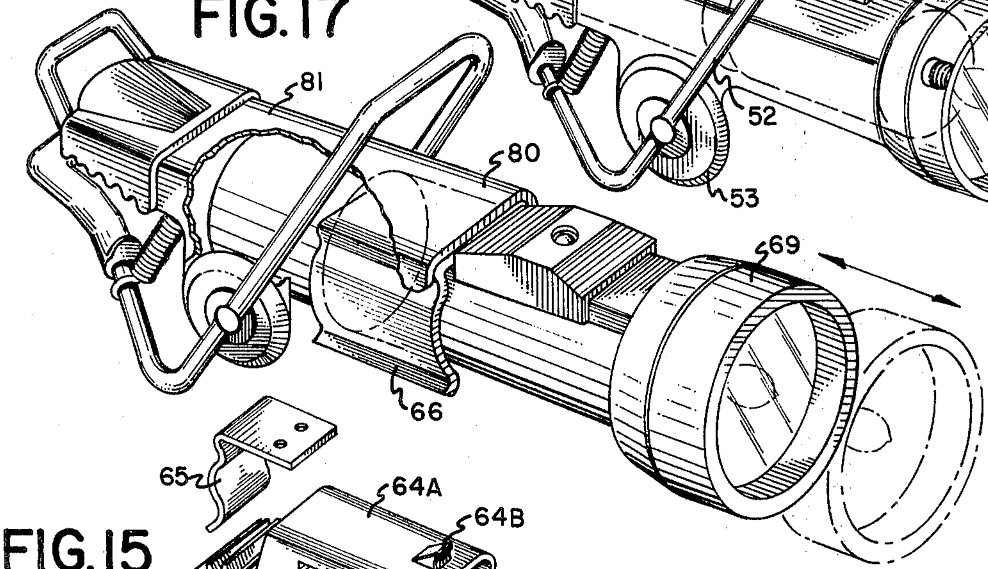
FIG. 17 is a perspective view of another embodiment.

FIG. 17 illustrates a modification of the embodiment illustrated in FIG. 14 and 15. The index wheel 64 has been removed and the bracket 66 permanently affixed to the underside of the top plate 80 of clamp housing 81. This allows for a deeper assembly penetration of light 69 into the clamp housing 81, as illustrated in FIG. 17. In all other respects the clamp assembly is similar to art of FIG. 13.

Figure 16:
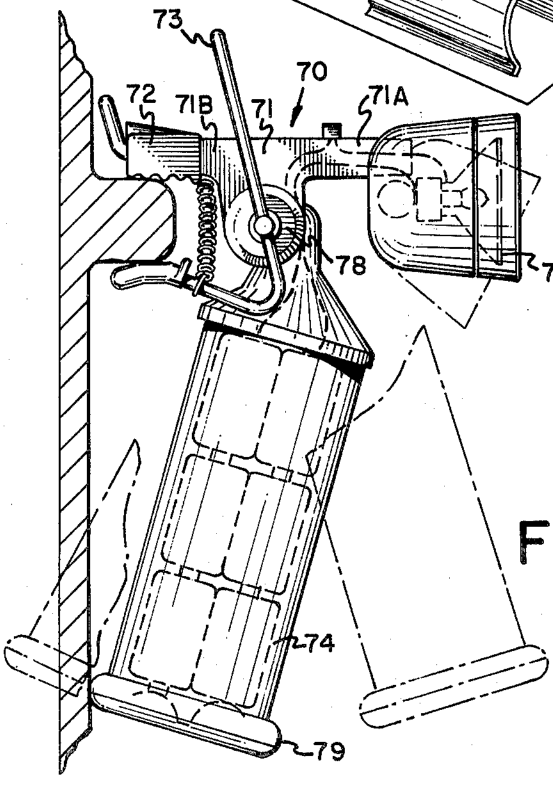
FIG. 16 illustrates another modified embodiment of the invention.

FIG. 16 illustrates a further modification of the instant invention. In this form of the invention the clamping assembly 70 similar to that described in FIGS. 1 to 12, except that it is utilized in conjunction with a lantern type light having a substantially large battery pack. As best seen in FIG. 16, the clamping light 70 disclosed therein comprises a main clamp housing 71 having a flat top plate 71A having depending side wall portions 71B similar to that described with respect to FIGS. 1 through 10. One end of the clamp housing 71 defines the fixed jaw 72 which is similar in construction to that described with respect to FIGS. 1 through 10. The second or movable jaw member 73 comprises an endless bail loop member which is bent intermediately thereof and which is pivotally connected to the yoke portion of the housing 71 similar to that hereinbefore described. An indexing wheel and connected arm is pivoted between the yoke portion of the clamp housing as hereinbefore described.

In this form of the invention, there is connected to the arm portion of the indexing wheel a casing or housing 74 for containing the battery pack by which the light 75 is energized. As shown in FIG. 16, the bottom of the battery casing 74 is provided with a circumscribing plastic or rubber bumper or ring 75 which may be utilized to engage against a vertical portion of a supporting structure to facilitate the positioning and reduce some of the downward pull of the lighting embodiment as shown. It must be stressed that the spring pressured index wheel 78 subassembly enhances the possibility of having the power pack 74 exert constant horizontal force against the supporting vertical structure, and thereby reducing even further the downward pull by creating a drag effect and increasing the gripping ability of the jaws to hold the larger weighted power packs.

Connected to the other end of the main clamping housing is a bulb and reflector assembly within the light housing 75 which is pivotally mounted to the clamp housing 71 to pivot thereabout. It will be understood that electrical conductors (shown) operatively connect to the bulb in circuit with the battery pack. A suitable switching means is also operatively connected in circuit so as to effect the energizing and de-energizing of the light bulb in a well known manner.

From the foregoing description, it will be readily apparent that the cocking of the jaws of the described clamping assembly to an open position can be readily facilitated by simply grasping the handle portion extending above the main clamp housing of the movable jaw with one's thumb and grasping the front finger grip of the fixed jaw, if the jaw extension is protracted, or the finger grip portion of the jaw extension when in the retracted position, and applying a squeezing force thereto. This will effect the rotation of the movable jaw to an open position as illustrated in FIGS. 10 and 12. Thus the arrangement is such that the jaws can be readily cocked so that the unit can be attached to a suitable supporting surface, as for example, a door knob, door edge, or any other convenient supporting structures adjacent to where a work performing operation is to be performed. The arrangement is such that many other hand relationships or gripping patterns may be used to effect the cocking jaws to an open position, besides the hand relationship described here and illustrated in FIG. 12.

It will also be apparent that the various embodiments, as disclosed, in FIGS. 1 to 12 and 14, will permit a light beam to be rotated from a neutral position wherein the light is horizontally disposed to almost a full 180 degrees relative thereto. By reversing the clamping light assembly relative to a support structure, the light beam can be pivoted approximately 180 degrees either above the pivot or below the pivot. Therefore, depending upon how the lighting assembly is clamped onto a supporting surface, the light can be rotated or angularly directed in almost any degree in elevation.

A unique feature of the swiveling-clamping light as disclosed herein is that the gripping action of the clamping jaws is enhanced or increased when the light is rotated around the pivot point of the indexing wheel. This greater gripping action of the clamping jaws is achieved by the shifting of the center of weight of the light around the pivot axis and toward the biting jaws area. Which in turn develops a larger holding pressure enhancing the gripping action of the jaws. The heavy power pack clamping lantern embodiment in FIG. 16 relies very heavily on the above described characteristic of the shifting of the center of weight of the light or power pack in order to achieve holding greater weights with the same clamp construction as shown in FIGS. 1 through 12.

It will also be noted that the wide mouth construction of the jaws 23 and 28 provides an effective gripping action which will permit a user to swing the clamping light unit in asmuth to the left or right within an approximate range of 120 degrees. Thus the arrangement is such that the biting jaws 23 and 28 provide sufficient bite to grip onto an edge of a supporting surface when only a portion of the jaws are secured to the supporting surface. Therefore, when the clamping light structure described is supported, for example on the edge of a table, the light is capable of a horizontal adjustment through an angle of approximately 120 degrees and movement in a vertical plane of approximately 300 or more degrees. Thus, the range of adjustment in both asmuth and zenith is such that the light beam can be directed in most any direction.

In the event that the normal opening of the fixed jaw relative to the movable jaw is not sufficient to grip a given support, the jaw opening can be enlarged by extending the jaw extension 31 relative to the fixed jaw portion the necessary amount. Thus, as seen in FIG. 12, the range of jaw openings can be adjusted to accommodate a support of substantially different dimensions and/or shapes.

From the foregoing, it will be apparent that the clamping light construction incorporates a clamping system which facilitates the clamping of the light to varying shape supports as for example door knobs, wood cross sections, one's wrist or hand, a car fender, or any other available support so that under extreme emergency conditions the clamping assembly can be secured to many possible existing supporting surfaces.

While the instant invention has been disclosed and described with respect to several embodiments, thereof, it will be readily understood and appreciated that variations and modifications may be made without departing from the spirit or scope of the invention.

What is claimed is:

1. A clamping light construction comprising a first jaw forming member including a main clamp housing having a front gripping jaw portion; a second jaw forming member including a bail member which is angularly bent intermediate the ends thereof whereby one end defines a jaw portion deposed opposite said front gripping jaw portion of said first jaw forming member, and the other end of said bail member extending to the opposite side of said first jaw forming member defining a handle, means for pivoting said bail member intermediate the ends thereof to said first jaw forming member whereby said jaw portion of said bail member is rendered pivotally mounted for movement relative said front gripping jaw portion of said first jaw forming member, spring means disposed between said first jaw forming member and said second jaw forming member for normally biasing said jaw portion of said bail member toward said front gripping jaw portion of said first jaw forming member, means defining a holder operatively associated with said first jaw forming member, and a light means supported in said holder.

2. A clamping light construction as defined in claim 1 and including a means defining a jaw extension adjustably connected for movement relative to said front gripping jaw portion of said first jaw forming member.

3. A clamping light construction as defined in claim 1 wherein said jaw extension means includes a front gripping portion to function as a finger grip in one position and a locking clamp grip in another position.

4. A clamping light construction as defined in claim 1 wherein said bail member is defined as an endless loop, one end of which defines said gripping jaw portion and the other end thereof said handle portion.

5. A clamping light construction as defined in claim 4 and including a jaw extension connected to said front gripping jaw portion of said main clamp housing to extend between a retracted and protracted position relative to said front gripping jaw portion of said main housing.

6. A clamping light construction as defined in claim 1 wherein said pivoting means includes an indexing means, said holder means being connected to said indexing means whereby said holder means is adjustably disposed relative to said jaw members.

7. A clamping light construction as defined in claim 6 and including a spring detent for maintaining said indexing wheel in an adjusted position.

8. A clamping light construction as defined in claim 7 wherein said holder means includes means for detachably securing said light means thereto.

9. A clamping light construction as defined in claim 8 wherein said light means comprises a portable flashlight.

10. A clamping light construction as defined in claim 1 and including a non-slip coating disposed about the jaw portion of said first and second jaw members.

11. A clamping light construction comprising
a first and second jaw member, said first jaw member includes a clamp housing having a top plate having opposed depending side wall portions, said top plate having a front end portion defining a jaw portion, and said opposed side walls intermediate to the ends thereof having an extended portion to define a yoke, said second jaw member including a bail member bent intermediate to the ends thereof, said bail member having opposed side portions adapted to straddle said clamp housing, and a cross member interconnected between said opposed side portions at each end of said bail member whereby one end of said bail member defines a jaw portion complementing said jaw portion of said clamp housing; and the other end thereof a handle portion, said jaw portion of said bail member and said handle portion thereof being disposed to opposite sides of said first jaw member, a spring means interconnected between said jaw portions for normally biasing said jaw portions toward a closed position;

a pivot means pivotally connecting said bail member to said yoke, said pivot means includes an indexing wheel disposed between said yoke, a detent engaging said indexing wheel to maintain said indexing wheel in an adjusted position, a means defining a holder connected to said index wheel, and a light means connected to said holder whereby said light means can be indexed to an adjusted position relative to said jaw members to rotation of said indexing wheel.

12. A clamping light as defined in claim 11 and including complementary latching means on one of said jaw members and said holder means for detachably locking said holder means to said one jaw member.

13. A clamping light as defined in claim 11 wherein said holder means comprises a slideway extending laterally of said index wheel, and said light means includes a casing having a complementary rail portion adapted to be slidably received in said slideway; and said latching means including an opening formed in said top plate of said housing and said holder including a catch adapted to be received in said opening when said holder is disposed in a neutral position adjacent to said clamp housing.

14. A clamping light as defined in claim 11, 12, or 13 and including a jaw extension means for adjustably connecting said jaw extension to jaw portion of said clamp housing whereby said jaw extension is rendered adjustable relative thereto between a retracted and protracted position.

15. A clamping light construction as defined in claim 14 wherein said jaw extension comprsies a generally U-shaped member having opposed leg portions slidably disposed relative to said front end portion of said clamp housing, and a bight portion interconnected between said leg portions, said bight portion being angularly disposed to function either as a finger grip portion or extended clamping and locking jaw.

16. A clamping light construction as defined in claim 11 wherein said holder includes a U-shaped bracket for detachably receiving said light means.

17. A clamping light construction as defined in claim 16 and including a latching means for detachably connecting said holder to said top plate.

18. A clamping light construction comprising:

a clamp housing having one end defining a clamping jaw, a movable jaw member pivotally connected to said clamp housing, said movable jaw member having one end defining a jaw complementing said clamping jaw of said clamp housing, and the other end thereof forming a handle, said complementing jaw and handle being disposed to opposite sides of said clamp housing, means for normally biasing said jaws toward their closed positions, means defining a battery pack support connected to said clamp housing adapted to support a battery pack therein, means defining a light head connected to the other end of said clamp housing, and electrical conductors connecting the battery pack supported in said battery pack support to said light head.

19. The clamping light construction as defined in claim 18 and including means for pivotally connecting said light head to said clamp housing.

20. The clamping light construction as defined in claim 19 and including an indexing means, and said battery pack support means being connected to said indexing means whereby said battery pack means can be adjustably supported relative to said clamp housing.

21. The clamping light construction as defined in claim 20 and including a jaw extension connected to the clamping jaw of said housing, said jaw extension being connected to said clamp housing to extend between a protracted and retracted position relative to said clamp housing.

22. The clamp construction as defined in claim 21 and including means for biasing said jaw members toward their closed position.

* * * * *